United States Patent [19]

Treichl et al.

[11] Patent Number: 5,547,159
[45] Date of Patent: Aug. 20, 1996

[54] MANUALLY OPERABLE MECHANICAL MEMORY DEVICE

[75] Inventors: Markus Treichl, Rossach; Christian Alt, Coburg, both of Germany

[73] Assignee: Brose Fahrzeugteile GmbH & Co. KG, Coburg, Germany

[21] Appl. No.: 311,501

[22] Filed: Sep. 23, 1994

[30] Foreign Application Priority Data

Oct. 5, 1993 [DE] Germany ............................ 43 33 892.5

[51] Int. Cl.$^6$ ................................................. F16M 13/00
[52] U.S. Cl. ........................... 248/429; 248/550; 248/419
[58] Field of Search ................................. 248/429, 424, 248/419, 420, 430, 550

[56] References Cited

U.S. PATENT DOCUMENTS

| | | | |
|---|---|---|---|
| 4,652,052 | 3/1987 | Hessler et al. | 248/430 X |
| 4,844,542 | 7/1989 | Humer | 248/430 X |
| 4,881,774 | 11/1989 | Bradley et al. | 248/430 X |
| 5,100,092 | 3/1992 | Sovis | 248/429 |
| 5,137,331 | 8/1992 | Colozza | 248/430 X |
| 5,407,165 | 4/1995 | Balocke | 245/429 |

FOREIGN PATENT DOCUMENTS

| | | | |
|---|---|---|---|
| 2430330 | 3/1980 | France | 248/429 |
| 3809135 | 10/1988 | Germany . | |
| 3902510 | 8/1989 | Germany . | |

Primary Examiner—Alvin C. Chin-Shue
Assistant Examiner—Brian J. Hamilla
Attorney, Agent, or Firm—Christie, Parker & Hale, LLP

[57] ABSTRACT

A manually operable mechanical memory device comprises at least one slider slidably mounted within a slider rail attached to one member of a seat guide system. The slider includes at least one stop face adjacent an end of the slider. A stop element is retractably attached to a second seat guide member that is movable relative to the first seat guide member. The stop element is movable from a neutral position outside of the slider to a stop position capable of placement within the slider and engagement against the stop face. The slider includes a catch to prevent the stop element from entering the slider from the neutral position. The slider includes a striker that locks the stop element within the slider and against the stop face. The slider also includes an engagement hook disposed therein that comprises one end portion that extends through an opening through the slider positioned adjacent the stop face, and an opposite end portion that extends through another opening in the slider and through an engagement opening in the slider rail to fixedly attach the slider to the slider rail. Slidable movement of the slider vis-a-vis the slider rail is accomplished by placing the stop element within the slider and adjacent the stop face, thereby aligning the stop element with the opening, and displacing the stop element into the opening to cause the end portion of the extension hook to disengage the engagement opening.

16 Claims, 5 Drawing Sheets

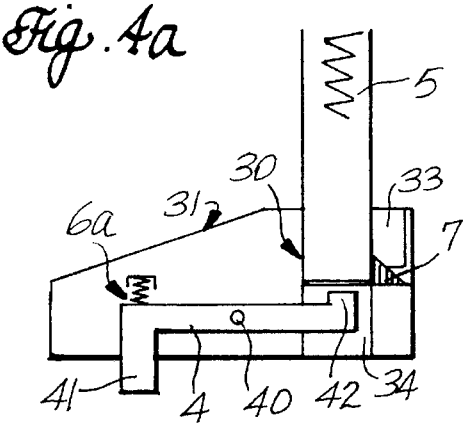
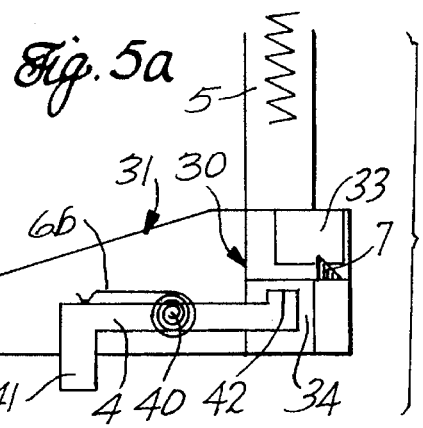
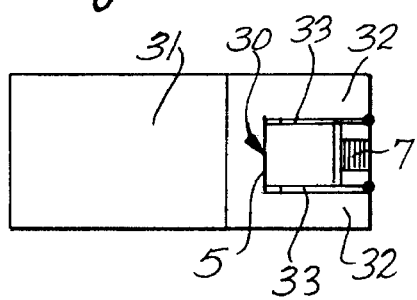
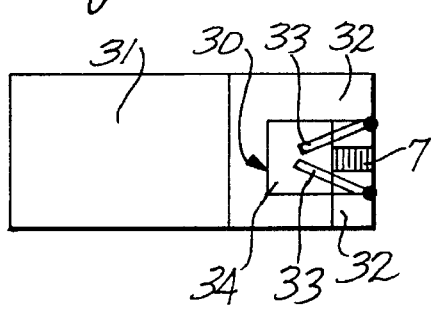
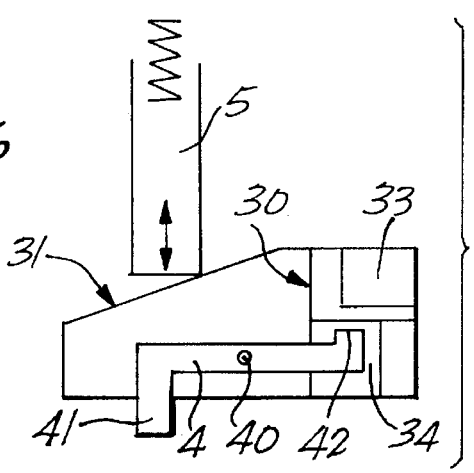

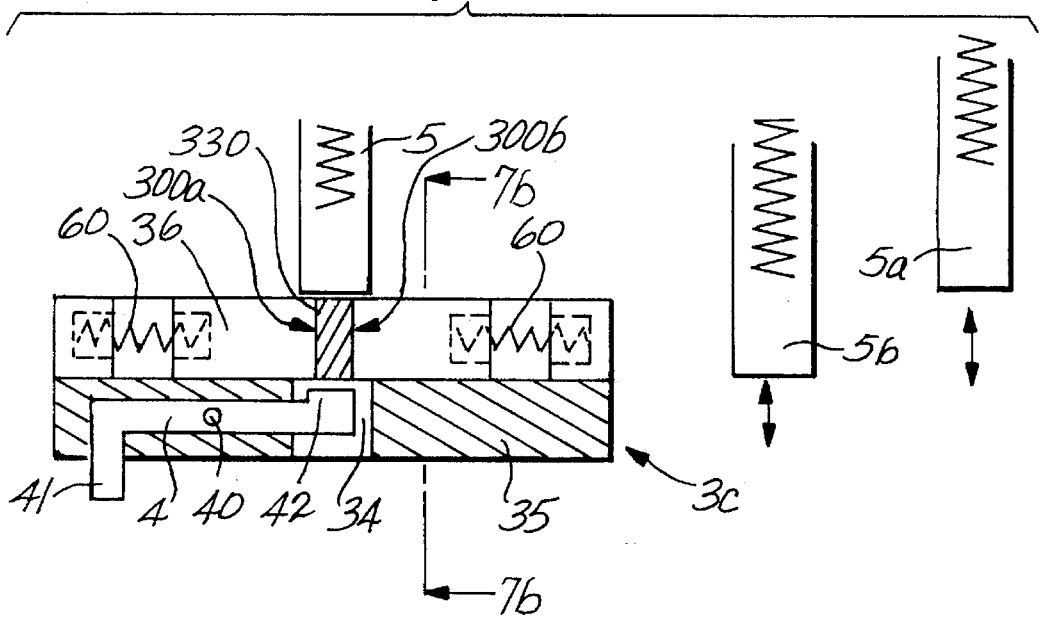
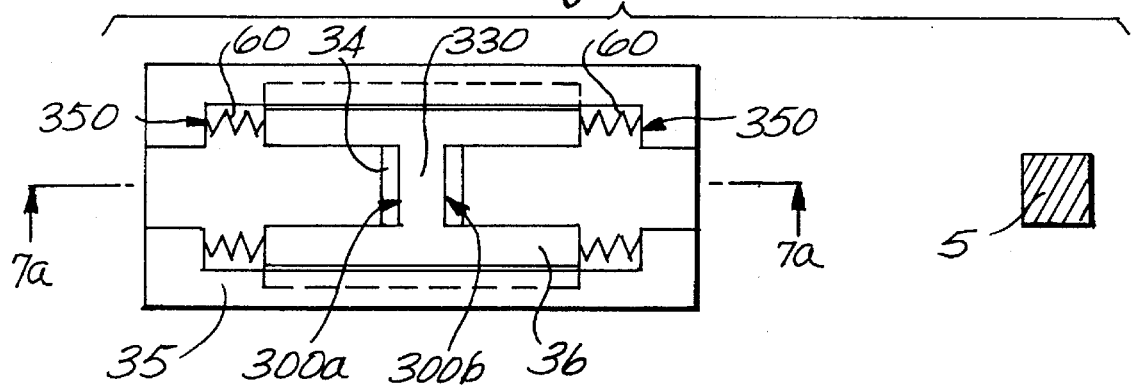

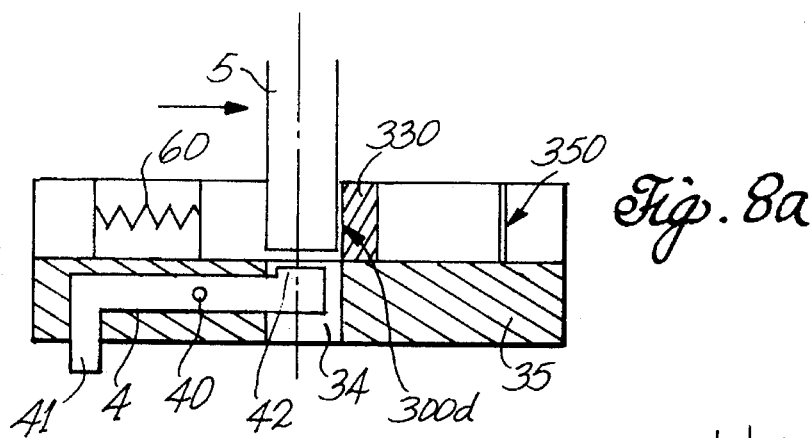
Fig. 8a
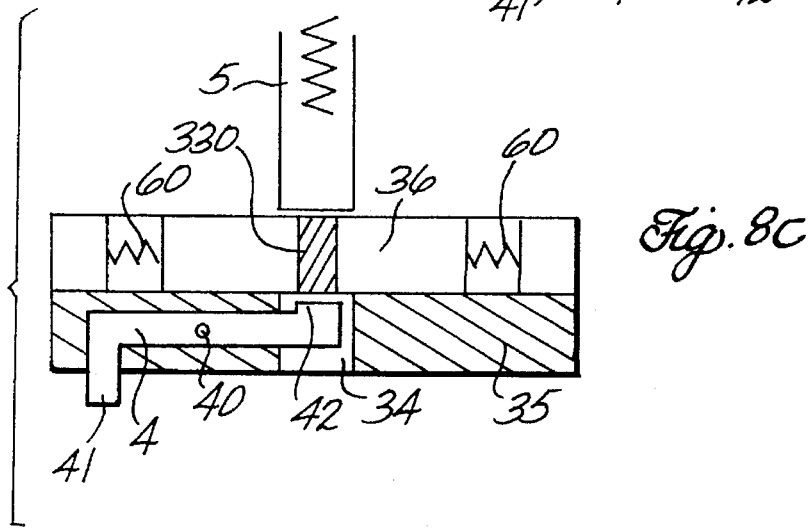
Fig. 8b
Fig. 8c
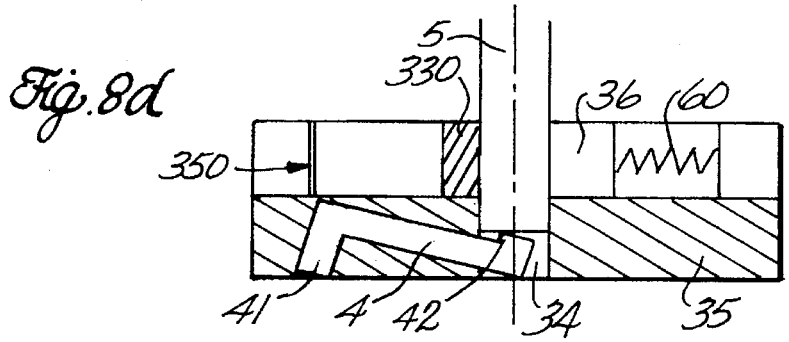
Fig. 8d

MANUALLY OPERABLE MECHANICAL MEMORY DEVICE

FIELD OF THE INVENTION

The invention relates to a manually operable mechanical memory device for storing preferably two individually programmable seat positions, in particular longitudinal seat positions, of an adjustable seat of a motor vehicle.

BACKGROUND OF THE INVENTION

In addition to known, electronically operated memory devices for adjusting the position of an automobile seat to a preset and stored seat position upon the actuation of a button, mechanically operating memory devices for adjusting the position of an automobile seat have also been developed. An example thereof is described in German Patent Publication DE 38 09 135 A1, which discloses a device comprising a slide-like stop that is seated on an arresting shaft and positively connected therewith. The arresting shaft can be brought into contact with an associated counter-stop on a respective seat rail. The slide-like stop is maintained in positive connection with teeth of the arresting shaft by a spring force and can be released from the teeth by means of a pivot movement, thereby displacing the stop along the arresting shaft in order to set a new stop position or memory position.

Although in the described solution there is a considerable separation of the active components of the seat arrest from the memory device, a seat adjustment is only possible up to the stop or between two stops. It is not possible to move or adjust the seat past the stop and, at the same time, retain the preset or stored seating position. If it is intended to take up a seat position which lies beyond the stop, a displacement of the stop is required. However, displacement of the stop results in the loss of the corresponding memory position. According, one wishing to ease their entrance into a vehicle by displacing the seat a distance away from the steering wheel or dash of the vehicle, or one wishing to use the vehicle that is not familiar with the memory function of the seat, is unable to reposition the seat without loosing the stored memory position.

A memory device for the longitudinal positioning of a vehicle seat in two individual settings is described in German Patent Publication DE 39 02 510 A1. The two individual settings correspond to engagement positions of a memory bolt with one of two memory members. When a memory function is activated by means of a lever, the memory bolt falls out of a neutral position into one or the other memory member, depending on the selection movement performed. The locking device is out of engagement during the selection movement. A bolt, which can be displaced against the force of a spring, can be used as the locking member. A lifting pin acts on it, the end of which faces away from the locking bolt and is connected with the memory bolt via an intermediate lever. Although this embodiment permits a memorized adjustment of a vehicle seat between two different stored positions, the relatively large technical outlay associated with the device is a disadvantage of the proposed solution.

It is, therefore, desirable that a memory device be constructed that will allow for the setting of seating positions and accommodate movement of a seat beyond such settings without resulting in the loss of such settings. It is desired that the device accommodate movement of the seat throughout its entire displacement range in a manner that is easy for one to understand without specialized knowledge of the memory function. It is desirable that the device be of a simple mechanical design that is manufactured by conventional coat-effective manufacturing techniques and from conventional materials. It is desirable that the device be of a compact design to facilitate its use with vehicle seating. It is also desirable that the device be constructed to provide simple programming or reprogramming of the memory device.

SUMMARY OF THE INVENTION

A manually operable memory device constructed according to principles of this invention is of simple mechanical design, is constructed by cost-effective manufacturing techniques, has small space requirements, is capable of accommodating placement of a seat through an entire displacement range without resulting in loss of stored seating positions and by a user not familiar with the memory function, and is simple to program or reprogram the memory device.

The device comprises at least one slider rail supporting sliders and essentially extending in the adjustment direction, and a stop element which can be brought into engagement with the slider and is movable vertically in the direction toward the slider rail, wherein the stop element is a part of a searching/programming unit. The slider rail is movably connected in a conventional manner with the floor of the vehicle and the searching/programming unit is connected with the seat frame, or vice versa.

The memory device constructed in accordance with principles of this invention is distinguished by the stop element which, when the unlocking device of the seat adjustment is actuated, can be brought out of a neutral position, which is relatively distant from the slider rail, into a stop position, which is relatively close to the slider rail. The sliders disposed on the slider rail are equipped with a stop face which is effective on at least one side. In the course of a displacement of the seat in the direction toward the stop face, the stop element comes into contact with the slider, by means of which the displacement movement in the direction taken toward the slider is ended. A catch provided on the slider makes it possible to continue to displace the seat in the direction taken without moving the slider, if the actuating lever of the unlocking device is briefly released and then again actuated.

The displacement of the stop element from its neutral position into the stop position can take place together and simultaneously with the locking element via one and the same actuating lever. Alternatively, it is possible to provide a separate actuating element which controls the stop element independently of the locking element, wherein the separate actuating element has no effect on the locking device.

The sliders in accordance with the invention can be constructed having at least two embodiments, wherein a first embodiment comprises sliders having a stop face for the stop element in only one adjustment direction, and wherein a second embodiment comprise sliders having stop faces in both adjustment directions. The first embodiment of the sliders have a sliding surface on the side facing away from the stop face, which rises from its free end in the direction of the stop face and terminates in a plateau, which represents the largest vertical extent of the slider in respect to the slider rail. This sliding surface is used by the stop element to pass over the slider, in the course of which the stop element, which in the stop position is prestressed by a spring against the slider, can be lowered in front of the stop face when the rider is being passed over from the side of the sliding surface. When arriving from the other direction, the stop element pushes the catch away and comes into contact with the stop face. When the actuation device is released, the stop element rises and the catch again takes up its unstressed position. By means of a renewed actuation of the memory device the stop element is lowered on the catch so that the seat can be displaced in both directions without problems.

The second embodiment of the sliders have stop faces for both adjustment directions, so that a memory position equipped with them can be approached from one as well as another direction and can be detected by placement of the stop element into a programmed memory position by its engagement against the stop face of the catch after the stop element has approached the slider from either side. A catch is also part of this embodiment and permits displacement of the seat in both directions after the memory position has been found and the memory device has again been actuated.

Both embodiments of the described sliders can be displaced by means of the stop element, provided the latter is in the stop position which corresponds to reprogramming of the respective seat position. This is accomplished by further displacement of the stop element in the direction of the slider rail, because of which the front of the stop element releases the engagement of the slider with the slider rail. An engagement hook embodied as a double-armed lever preferably provides the locking of the slider with the slider rail. A spring pushes the end of the engagement hook used for locking in the direction toward the slider rail and in this way prevents the unintentional displacement of the slider. The graduation and the positioning of the engagement openings correspond with those for the seat locking. To assure that in case of reprogramming of a memory position of the seat an engaged locking of the slider takes place in every case, means can be provided which keep the stop element in positive contact with the slider until the seat lock has been at least partially engaged. Unilaterally acting strikers are suitable for this, which are disposed opposite the stop faces of the slider and on the other side of the opening for reprogramming, wherein the striker can be passed over without problems by the stop element in the direction of the stop face. In the other direction the stop element is released by the striker only after the locking elements of the seat adjustment are at least partially engaged.

BRIEF DESCRIPTION OF THE DRAWINGS

These and other features and advantages of the present invention will become appreciated as the same becomes better understood with reference to the specification, claims and drawings wherein:

FIG. 3b is a top plan view of the slider shown in FIG, 3a;

FIG. 4a is a cross-sectional side elevation of the slider in FIGS. 3a and 3b with the stop element in a stop position;

FIG. 4b a top plan view of the slider shown in FIG. 4a;

FIG. 5a is a cross-sectional side elevation of the slider of FIGS. 4a and 4b the stop element seated on top of the catch;

FIG. 5b is a top plan view of the slider in shown in FIG. 5a;

FIG. 6 is a cross-sectional side elevation of the slider in FIGS. 3a and 3b with a stop element seated on top of an inclined sliding surface;

FIG. 7a is a cross-sectional side elevational view of a second embodiment of a slider having stop faces for an approach by the stop element from two adjustment directions;

FIG. 7b is a cross-sectional front elevational view of the slider in FIG. 7a;

FIG. 7c is a top plan view of the slider in FIGS. 7a and 7b;

FIG. 8a is a cross-sectional side elevation of the slider in FIGS. 7a and 7b, with a stop element in the stop position, in the course of the displacement of the stop element from left to right;

FIG. 8b is a cross-sectional side elevation of the slider in FIG. 8a, with a stop element in the stop position, in the course of the displacement of the stop element from right to left;

FIG. 8c is a cross-sectional side elevation of the slider in FIGS. 8a and 8b, with a stop element seated on top of a catch; and FIG. 8d is a cross-sectional side elevation of the slider in FIGS. 8c, with a stop element in the programming position with the slider released.

DETAILED DESCRIPTION OF THE INVENTION

Figure 1:
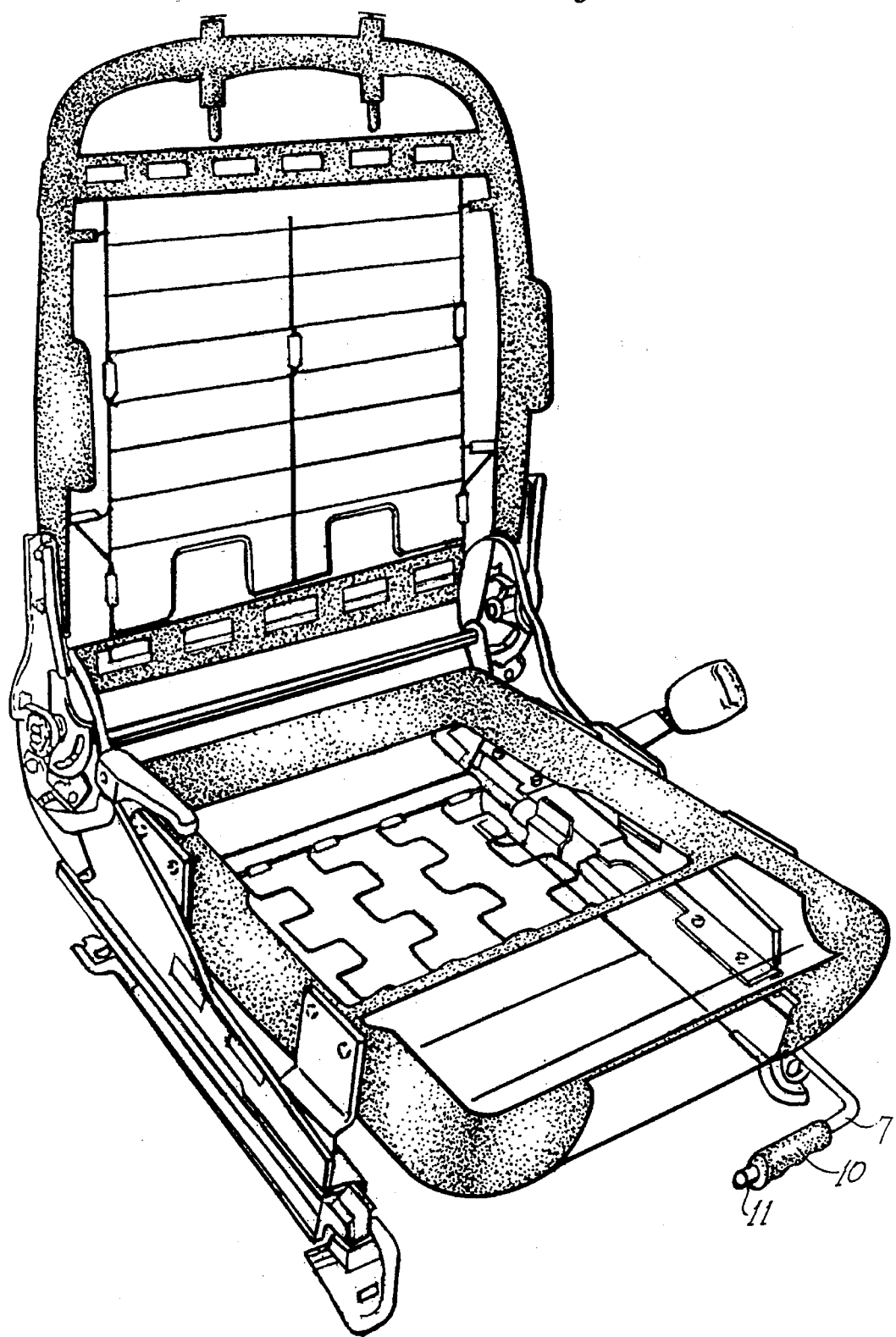
FIG. 1 is a perspective view of a seat frame with an unlocking lever for a longitudinal adjustment of the seat.

A memory device constructed in accordance with principles of this invention can be installed without problems in manually operable seats and can be worked with customary actuation means. FIG. 1 shows a seat frame with a lever 1 for operating a locking device. A handle 10 is disposed at an end portion of the lever 1 and comprises an integrated push button 11 is disposed therein, wherein the push button 11 is used for programming, and thus displacing, the memory elements.

Figure 2:
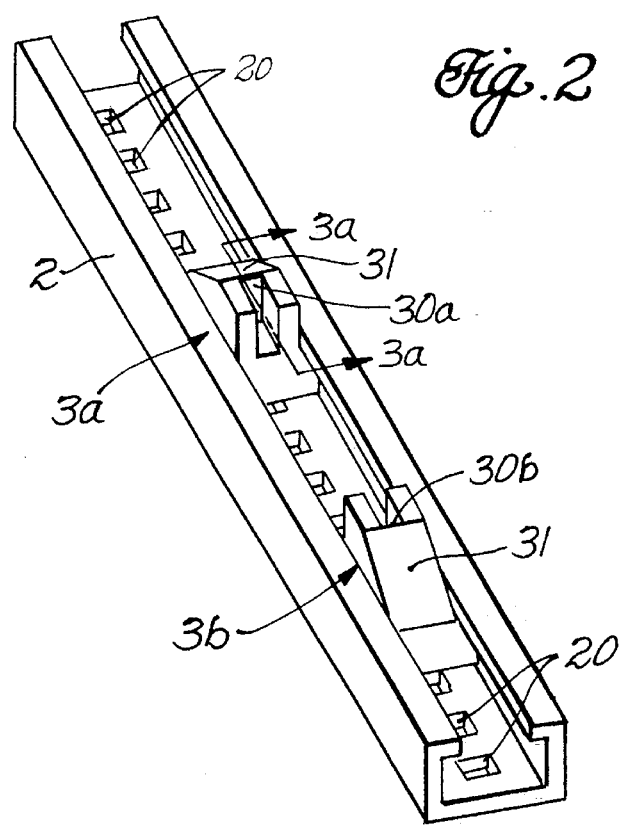
FIG. 2 is a perspective view of a slider rail with and first embodiments of two sliders mounted therein, each slider having one stop face for one adjustment direction.
Figure 3A:
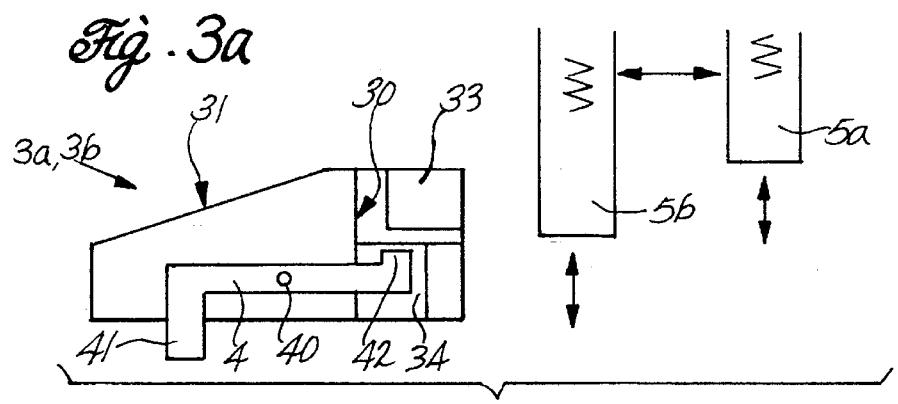
FIG. 3a is a cross-sectional side elevation of the slider shown in FIG. 2 with a stop element illustrated in both a neutral and stop position.

FIG. 2 illustrates an embodiment of a slider rail 2 supporting sliders 3a and 3b therein. The two sliders 3a, 3b are displaceably disposed in the slider rail 2. Locking elements 41 (as shown in FIG. 3a) of each slider 3a and 3b are configured to engage engagement openings 20 that are disposed at spaced intervals along an surface of the slider rail 2 that interfaces with each slider. The slider rail 2 can be movably connected to the seat frame or can be fastened on the vehicle floor or the lower rail of the guide system of the seat frame.

A searching/programming unit (not shown) is fixed on an opposing portion of the guide system of the seat frame. for example, if the slider rail is connected to the lower rail of the guide system that is mounted to the vehicle floor, the searching/programming unit can be mounted to an upper rail of the guide system that is mounted to an underside of the seat frame. The searching/programming unit includes a stop element. In place of using a separate slider rail 2, the integration of its function into the already present locking device is also possible without having to accept an impairment of the functions or of safety. In the same way it is possible to activate the searching/programming unit simultaneously with the operation of the seat adjustment, i.e. with the unlocking of the seat, and to approach the next memorized seat position located in the adjustment direction. If required it is of course possible to employ a separate actuation means for activating the searching/programming unit, which can be controlled independently of the locking elements of the seat adjustment.

The sliders 3a, 3b illustrated in FIG. 2 are a first embodiment constructed according to principles of this invention that are effective in one adjustment direction. Each slider 3a and 3b has only one stop face 30a and 30b, respectively, that is configured as a flat surface disposed within a channel-like opening in each slider. Each slider 3a and 3b has an inclined sliding surface 31 along a top surface and extending from the stop face to an end portion opposite the opening. The arrangement of the sliders 3a and 3b within the rail 2 shown in FIG. 2 has been chosen to be such that the stop faces 30a and 30b face each other, so that each slider 3a and 3b can only be approached by a stop element from the direction of the other slider 3a and 3b, i.e., so that the respective programmed seat positions can be found.

The first slider embodiment can be particularly successfully employed if no more than two seat positions are to be programmed for a seat. In this case only the adjustment section located between the sliders 3a, 3b is used as a rule. If it is intended to approach a seat position that is outside of the adjustment section (i.e., not within the section of rail defined between both sliders), it is necessary to interrupt the activation of the searching/programming unit briefly by raising the stop element into a neutral position, as better described below. Once interrupted, the seat can be displaced across the stop face of slider in the direction of the sliding surface 31. The catch required for this function will be described below and illustrated in subsequent drawing figures. A detailed description of the described sliders 3a and 3b, and the mode of functioning, will be provided below by means of FIGS. 3a through FIG. 6.

Figure 3B:
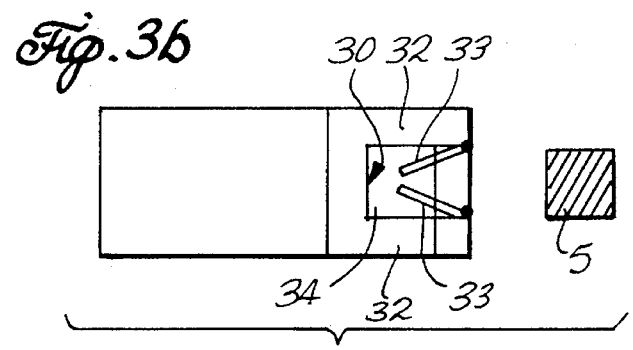

FIGS. 3a and 3b show different views of the first embodiment of the slider 3a and 3b having one stop face 30, with which a stop element 5 is associated. The stop element 5 is displaceable in respect to the stop face and is connected with the seat frame. The stop element 5 is shown in a non-memory or neutral seat position 5a in FIG. 3a, which can exist when the searching/programming unit is not activated to locate a memory position. In the non-memory or neutral position, the stop element is free to pass over the slider, during activation of the searching/programming unit, without engaging the stop face. The stop element 5 is also shown in a memory or stop position 5b in FIG. 3, which allows the stop element to engage a stop face of a slider during activation of the searching/programming unit to establish a programmed memory position.

In the course of approaching the stop face 30 with the stop element 5 in the stop position, wing-like resiliently seated catch elements 33 are pressed against opposing interior wall portions of legs 32 which support them. When the stop element 5 comes into contact with the stop face 30, a bottom portion of the stop element is positioned above an opening 34 in the slider at the same time. An engagement hook 4 is disposed within the slider 3a and 3b and serves to connect the slider to an engagement opening 20 in the slide 2. An unlocking stop is disposed within the opening 34 and is positioned directly below the stop element 5 to facilitate movement of the engagement hook 4 by pushing action of the stop element against the unlocking stop. By means of further lowering of the stop element 5, a pivotal rotation of the engagement hook 4 around a shaft 40 connecting hook 4 to the slider is generated. Further lowering the stop element causes the hook to be rotated sufficiently that an engagement projection 41 rises out of the engagement opening 20 of the slider rail 2 and permits a displacement of the slider 3 and, thus reprogramming of the seat position.

FIGS. 4a and 4b show the first embodiment of the slider in the stop position with a stop element 5 disposed against the stop face 30. In addition, the slider has a striker 7 at the edge of the opening 34 and opposite the stop face 30. The striker 7 is designed having a wedge-shaped configuration so that the vertically resilient stop element 5 can pass over it as it travels in a direction toward the stop face 30, and prevents movement of the stop element from the slider in an opposite direction. The advantage of using the striker is that it assures locking engagement of the stop element against the stop face of the slide and prevents unintended movement of the stop element away from the slider. Use of the striker also assures that unintended movement of the slider along the slider rail from a locked position will not occur unless the stop element is locked into a memory position within the slider.

The unintentional release of the slider 3a and 3b is prevented by a small worm spring 6a disposed within the slider which is supported on the engagement hook 4 on the side of the engagement projection 41. This task can of course also be performed by a different spring element, for example by a helical spring 6b seated on the shaft 40, as shown in FIG. 5a.

Referring to FIGS. 5a and 5b, the underside surface of the stop element 5 rests on top of a top portion of the catch 33. This case arises when the stop element 5 is raised out of the stop position to its neutral position (5a as shown in FIG. 3a) over the slider and is lowered again, such as takes place in the course of a deactivation with subsequent reactivation of the searching/programming unit without changing the seat position. Following the lifting of the stop element 5 into its neutral position 5a, the catch is automatically placed over the opening 34 again and allows an adjustment of the seat in any arbitrary direction. In order to find the same memory position belonging to this slider again, it is first necessary to bring the stop element 5 in front of the slider to the side adjacent the stop face 30.

FIG. 6 shows the stop element 5 of an activated searching/programming unit which is supported on top of the sliding surface 31 of the slider. When the stop element is placed in this position, the seat can be displaced into each one of the two adjustment directions, in the course of which it passes in one direction or the other over the slider.

The slider illustrated in FIGS. 7a–7c and 8a–8d is a second embodiment prepared according to principles of this invention. The slider 3c comprises two oppositely directed stop faces 300a and 300b, which are disposed on opposite sides of a catch 330 interposed therebetween. A slider base body 35 has a channel-like opening in the displacement direction that accommodates a bolt 36 therein which is slidably moveable in the displacement direction. The catch 330 is disposed in the center of the bolt 36. Springs 60 are positioned at each corner portion of the bolt between the bolt and slider body 35 and serve to maintain the unstressed bolt 36 in such a way that the catch 330 lies over an opening 34. The opening in the second slider embodiment functions in the same manner as that described above for the first slider embodiment, i.e., it is used to facilitate unlocking the slider from the slide by action of the stop element 5 upon the engagement hook.

The stop element 5 can freely enter the second embodiment of the slider 3c from either side. If the stop element encounters one of the two stop faces 300a and 300b of the catch 330, the bolt 36 is displaced in the corresponding direction within the body 35 until it encounters a stop 350 of the base body 35, as shown in FIG. 7c. In this position the stop faces 300a, 300b end flush with a sidewall portion of the opening 34. FIGS. 8a and 8b show corresponding stop positions of the activated stop element 5 in the course of entering the slider 3c from one or the other displacement direction.

Referring to FIGS. 8b and 8d, the stop element 5 is shown displaced into the programming position, which engages the opening 34 of the base body 35, wherein the underside surface of the stop element 5 presses the unlocking stop 42 of the engagement hook 4 down. Downward depression of the unlocking stop causes the engagement projection 41 to be lifted out of the engagement opening 20 of the slider rail 2 at the same time, wherein the slider 3c is taken along by the stop element 5.

When the desired seat displacement position has been attained, the seat is locked into position by the release of the actuating lever 1, causing the stop element 5 to be lifted into its neutral position 5a, and simultaneously causing the engagement projection 41 to engage an engagement opening 20 in the slider rail 2 to lock the slider into place. When the stop element 5 is placed into its neutral position 5a, shown in FIG. 8c, the bolt 36 returns to its initial unstressed position with the catch 330 located directly above the opening 34 and covering the unlocking stop 42.

If required, the second embodiment of the slider 3c can also be equipped with the strikers 7 that were discussed above for the first slider embodiment. It should also be noted that the catches 33 and 330 can be pivotally attached or slidably movable, respectively, differently than that specifically described above and illustrated in FIG. 3a through 8d.

The disclosure of attached German patent application Serial No. P 43 33 892.5, filed on Oct. 5, 1993 is incorporated fully herein by reference. Priority of this German patent application is claimed.

Although preferred embodiments of a manually operable mechanical memory device been specifically described and illustrated, it is to be understood that variations or alternative embodiments apparent to those skilled in the art are within the scope of this invention since many such variations may be made, it is to be understood that within the scope of the following claims, this invention may be practiced otherwise than specifically described.

What is claimed is:

1. A manually operable mechanical memory device for use with an occupant seat on a vehicle floor for storing at least one seat position, the device comprising:

at least one slider that is slidably displaced within a slider rail, wherein the slider includes at least one stop face positioned perpendicular to a longitudinal axis of the slider rail;

at least one stop element which can be brought into engagement with the slider and is movable vertically to the slider rail; wherein an element of the device selected from the group consisting of the stop element and the slider rail is adapted to be connected to a movable frame portion of the seat, wherein the other of such element in the group that is not connected to the frame portion of the seat is adapted to be fixed with respect to a portion of the vehicle floor, wherein the stop element is vertically displaceable between a neutral position and a stop position, and wherein the stop element is in contact against the stop face of the slider when placed in the stop position.

2. A manually operable mechanical memory device for use with an occupant seat on a vehicle floor for storing at least one seat position, the device comprising:

at least one slider that is slidably displaced within a slider rail, wherein the slider includes at least one stop face positioned perpendicular to the a longitudinal axis of the slider rail;

at least one stop element which can be brought into engagement with the slider and is movable vertically to the slider rail; wherein an element of the device selected from the group consisting of the stop element and the slider rail is adapted to be connected to a movable frame portion of the seat, wherein the other of such element in the group that is not connected to the frame portion of the seat is adapted to be fixed with respect to a portion of the vehicle floor, wherein the stop element is vertically displaceable between a neutral position and a stop position, and wherein the stop element is vertically disposed above the slider and remote from the stop face when placed in the neutral position.

3. A manually operable mechanical memory device for use with an occupant seat on a vehicle floor for storing at least one seat position, the device comprising:

at least one slider that is slidably displaced within a slider rail, wherein the slider includes at least one stop face positioned perpendicular to a longitudinal axis of the slider rail;

at least one stop element which can be brought into engagement with the slider and is movable vertically to the slider rail; wherein an element of the device selected from the group consisting of the stop element and the slider rail is adapted to be connected to a movable frame portion of the seat, wherein the other of such element in the group that is not connected to the frame portion of the seat is adapted to be fixed with respect to a portion of the vehicle floor, wherein the stop element is vertically displaceable between a neutral position and a stop position, wherein the slider includes a locking element to lock the slider into a fixed position on the slider rail, wherein the locking element is activated to release the slider by movement of the stop element, and wherein the locking element comprises:

an opening through a portion of the slider adjacent and perpendicular to the stop face; and an engagement hook pivotally mounted within the slider at a position beneath the stop face, wherein the hook has a first portion at one end that is disposed within the opening, and a second portion at an opposite end disposed within an opening in the slider rail, and wherein displacement of the stop element in the stop position against the first portion causes the second portion to simultaneously disengage the slider rail.

4. The device as recited in claim 3 wherein the catch is configured in the form of a movable part which in a displaced state accommodates placement of the stop element into the slider and against the stop face when the stop element is in the stop position, and which in a non-displaced state prevents placement of the stop element into the slider by vertical movement from the neutral position to the stop position.

5. The device as recited in claim 4 wherein the catch is configured having a movable structure selected from the group consisting of pivotally attached and slidably movable structures.

6. The device as recited in claim 3 wherein the slider further comprises a striker mounted at a distance opposite the stop face, wherein the striker extends a distance into a path of the stop element toward the stop face and is deformable to allow passage of the stop element into the slider in the stop position and prevents outward passage of the stop element from the slider in the stop position to fix the stop element into place within the slider and against the stop face.

7. A manually operable mechanical memory device for use with an occupant seat on a vehicle floor for storing at least one seat position, the device comprising:

at least one slider that is slidably displaced within a slider rail, wherein the slider includes at least one stop face positioned perpendicular to a longitudinal axis of the slider rail;

at least one stop element which can be brought into engagement with the slider and is movable vertically to the slider rail, wherein an element of the device selected from the group consisting of the stop element and the slider rail is adapted to be connected to a movable frame portion of the seat, wherein the other of such element in the group that is not connected to the frame portion of the seat is adapted to be fixed with respect to a portion of the vehicle floor, wherein the stop element is vertically displaceable between a neutral position and a stop position, and wherein the slider stop face is directed toward an end of the slider that is approached by the stop element, and wherein the slider includes an inclined sliding surface that extends along a top portion of the slider from the stop face to an end of the slider opposite the end approached by the stop element, wherein the sliding surface accommodates passage of the stop element over the slider.

8. A manually operable mechanical memory device for use with an occupant seat on a vehicle floor for storing at least one seat position, the device comprising:

at first slider that is slidably displaced within a slider rail, wherein the slider includes at least one stop face positioned perpendicular to a longitudinal axis of the slider rail;

at least one stop element which can be brought into engagement with the slider and is movable vertically to the slider rail, wherein an element of the device selected from the group consisting of the stop element and the slider rail is adapted to be connected to a movable frame portion of the seat, wherein the other of such element in the group that is not connected to the frame portion of the seat is adapted to be fixed with respect to a portion of the vehicle floor, wherein the stop element is vertically displaceable between a neutral position and a stop position, wherein the slider includes a locking element to lock the slider into a fixed position on the slider rail, wherein the locking element is activated to release the slider by movement of the stop element; and a second slider disposed on the slider rail that said first slider is disposed, wherein the first and second sliders are disposed so that the stop faces of each slider are directed toward one another and so that said stop face of said first slider is approached by movement of the stop element in one direction and the stop face of said second slider is approached by movement of the stop element in an opposite direction.

9. A manually operable mechanical memory device for use with an occupant seat on a vehicle floor for storing at least one seat position, the device comprising:

at least one slider that is slidably displaced within a slider rail, wherein the slider includes at least one stop face positioned perpendicular to a longitudinal axis of the slider rail;

at least one step element which can be brought into engagement with the slider and is movable vertically to the slider rail, wherein an element of the device selected from the group consisting of the stop element and the slider rail is adapted to be connected to a movable frame portion of the seat, wherein the other of such element in the group that is not connected to the frame portion of the seat is adapted to be fixed with respect to a portion of the vehicle floor, wherein the stop element is vertically displaceable between a neutral position and a stop position, wherein the slider includes a locking element to lock the slider into a fixed position on the slider rail, wherein the locking element is activated to release the slider by movement of the stop element, and wherein the slider further comprises:

a base body having a central opening in a displacement direction of the stop element; and a bolt slidably movable within the central opening in the displacement direction of the stop element and having a centrally located catch to accommodate placement of the stop element therein, wherein the bolt is centered within the body by at least one spring interposed between the bolt and body in the displacement direction of the stop element.

10. The device as recited in claim 9 wherein the catch includes a stop face at opposite side surfaces, wherein each stop face is directed toward opposite end portions of the slider corresponding to opposite displacement directions of the stop element.

11. A manually operable mechanical memory device for storing two individually programmable seat positions, the device comprising:

at least one slider slidably mounted within a slider rail, wherein the slider rail is adapted to be attached to a member selected from the group consisting of a vehicle floor and a vehicle seat frame wherein the slider comprises:

a slider body having at least one stop face disposed within and accessible from one end of the slider;

an opening disposed through the slider body adjacent the stop face, wherein the opening extends from the stop face to a surface adjacent the slider rail;

an engagement hook disposed within the slider body, wherein the hook includes one end that is disposed within the opening and an opposite end that is disposed within an engagement opening in the slider rail, wherein displacement of the end within the opening causes the end within the engagement opening to disengage, wherein the hook serves to lock the slider into fixed position on the slider rail;

a stop element adapted to be attached to the other member of the group that is not attached to the slider rail, wherein the slider and stop element are slidably movable with respect to one another in a displacement direction parallel with the slider rail, and wherein the stop element is configured to be operated in a neutral position that does not engage the stop face and a stop position that engages the stop face.

12. The device as recited in claim 11 wherein in the stop position with the stop element engaged against the stop face the stop element is aligned with the opening in the slider, and wherein displacement of the stop element into the opening causes disengagement of the slider from the slider rail.

13. The device as recited in claim 12 wherein the slider includes an inclined surface along a top portion of the slider that extends from the stop face to an end of the slider opposite from a slider end adjacent the stop face.

14. The device as recited in claim 13 wherein the slider further comprises a catch positioned adjacent the stop face and made from a deformable member, wherein in a deformed state the catch accommodates placement of the stop element in the stop position into the slider and adjacent the stop face, and wherein in a nondeformed state the catch prevents placement of the stop element from a neutral position into the slider.

15. The device as recited in claim 14 wherein the slider further comprises a striker mounted a distance from the stop face, wherein the striker is formed having a configuration that accommodates passage of the stop element into the slider in the stop position and against the stop face and prevents movement of the stop element in the stop position directed away from the stop face.

16. The device as recited in claim 11 wherein the slider body has an open center portion in a displacement direction of the stop element, and wherein the slider further comprises:

a bolt centered within the open center portion and slidably mounted therein;

a catch centered within the bolt and having two stop faces each positioned at opposite sides of the bolt that are each directed toward an end portion of the slider approachable by the stop element; and at least one spring mounted between the bolt and slider body to maintain the bolt in a centered position within the body, wherein, in the center position, the opening is covered by the bolt.

\* \* \* \* \*

UNITED STATES PATENT AND TRADEMARK OFFICE
CERTIFICATE OF CORRECTION

PATENT NO. : 5,547,159
DATED : August 20, 1996
INVENTOR(S) : Markus Treichl; Christian Alt It is certified that error appears in the above-indentified patent and that said Letters Patent is hereby corrected as shown below:

On the Title Page, Item 56, References Cited,
        change "5,407,165  4/1995  Balocke . . . 245/429"
        to     -- 5,407,165  4/1995  Balocke . . . 248/429 --.
Column 1, line 12, after "known" delete the comma.
Column 1, line 37, change "According," to -- Accordingly, --.
Column 1, line 41, change "loosing" to -- losing --.
Column 2, line 4, change "coat-effective" to -- cost-effective --.
Column 2, line 57, change "comprise" to -- comprises --.
Column 3, line 55, replace "with and" with -- with the --.
Column 3, line 61, change "FIG, 3a" to -- FIG. 3a --.
Column 3, line 66, after "FIGS. 4a and 4b" insert -- with --.
Column 4, line 1, replace "in" with -- as --.
Column 4, line 27, change "FIGS. 8c" to -- FIG. 8c --.
Column 4, line 39, after "button 11" delete "is".
Column 4, line 47, change "an surface" to -- a surface --.
Column 5, line 59, after "stop" insert -- 42 --.
Column 7, line 30, change "FIG. 3a through 8d" to
        -- FIGS. 3a through 8d --.
Column 7, line 37, after "device" insert -- has --.

UNITED STATES PATENT AND TRADEMARK OFFICE
CERTIFICATE OF CORRECTION

PATENT NO. : 5,547,159
DATED : August 20, 1996
INVENTOR(S) : Markus Treichl; Christian Alt It is certified that error appears in the above-indentified patent and that said Letters Patent is hereby corrected as shown below:

Column 8, line 3, after "perpendicular to" delete "the".
Column 9, line 35, change "at first" to -- a first --.
Column 10, line 3, change "step" to -- stop --.

Signed and Sealed this

Twelfth Day of May, 1998

Attest:

BRUCE LEHMAN

Attesting Officer

Commissioner of Patents and Trademarks